United States Patent
Koelsch

(10) Patent No.: US 9,415,660 B2
(45) Date of Patent: Aug. 16, 2016

(54) BACKUP POWER GENERATOR FOR BATTERY POWERED TRANSPORT REFRIGERATION UNITS

(71) Applicant: Ronald Koelsch, Roscommon, MI (US)

(72) Inventor: Ronald Koelsch, Roscommon, MI (US)

( * ) Notice: Subject to any disclaimer, the term of this patent is extended or adjusted under 35 U.S.C. 154(b) by 0 days.

(21) Appl. No.: 14/932,338

(22) Filed: Nov. 4, 2015

(65) Prior Publication Data

US 2016/0129753 A1    May 12, 2016

Related U.S. Application Data

(60) Provisional application No. 62/076,020, filed on Nov. 6, 2014.

(51) Int. Cl.
*B60K 1/00* (2006.01)
*B60H 1/00* (2006.01)
*B60P 3/20* (2006.01)

(52) U.S. Cl.
CPC ........ *B60H 1/00264* (2013.01); *B60H 1/00364* (2013.01); *B60H 1/00428* (2013.01); *B60P 3/20* (2013.01)

(58) Field of Classification Search
CPC ........... B60H 1/00264; B60H 1/00364; B60H 1/00428; B60P 3/20
USPC ............................................. 180/165, 65.31
See application file for complete search history.

(56) References Cited

U.S. PATENT DOCUMENTS

| | | | | |
|---|---|---|---|---|
| 736,459 A * | 8/1903 | Synnestvedt | ........... | B60G 11/22 180/305 |
| 893,498 A * | 7/1908 | Higdon | .................... | B60K 5/08 180/297 |
| 4,314,160 A * | 2/1982 | Boodman | .............. | B60K 16/00 180/2.2 |
| 5,215,156 A * | 6/1993 | Stulbach | ................. | B60L 11/12 180/165 |
| 5,667,029 A * | 9/1997 | Urban | .................... | B60K 6/442 180/65.23 |
| 5,680,907 A * | 10/1997 | Weihe | ...................... | B60K 8/00 180/15 |
| 5,921,334 A * | 7/1999 | Al-Dokhi | .................. | B60L 8/00 180/2.2 |
| 6,179,078 B1 * | 1/2001 | Belloso | .................... | B60K 1/00 180/65.285 |
| 6,752,229 B2 * | 6/2004 | Ho | ........................... | B60K 6/36 180/181 |
| 6,828,691 B2 * | 12/2004 | Tu | ............................ | B60K 1/00 290/40 C |

(Continued)

*Primary Examiner* — Hau Phan
*Assistant Examiner* — Jacob Meyer

(57) ABSTRACT

The generation of electrical power for large-vehicle transport refrigeration units (TRU) such as semi-trailer reefers. A generator is mounted to the vehicle frame or axle carriage and driven by a wheel-pulley system. Translational motion of the heavy vehicle produces electrical power using the substantial momentum of the vehicle. The electrical power can also be supplemented by at least one solar panel mounted on the roof of the semi-trailer reefer.

2 Claims, 5 Drawing Sheets

(56) References Cited

U.S. PATENT DOCUMENTS

| | | | |
|---|---|---|---|
| 6,962,223 B2* | 11/2005 | Berbari | B60K 6/105 180/165 |
| 7,325,638 B1* | 2/2008 | Belloso | B60K 5/08 180/14.2 |
| 7,478,693 B1* | 1/2009 | Curtis | B60K 6/105 180/165 |
| 7,547,980 B2* | 6/2009 | Harrison | F03G 7/08 290/1 R |
| 7,647,994 B1* | 1/2010 | Belloso | B60K 6/448 180/65.25 |
| 8,104,560 B1* | 1/2012 | Huang | B60K 6/30 180/165 |
| 8,295,950 B1* | 10/2012 | Wordsworth | B60H 1/00428 307/86 |
| 8,347,999 B2* | 1/2013 | Koelsch | B60K 25/08 180/165 |
| 8,439,140 B1* | 5/2013 | Amortegui | B60K 25/08 180/65.51 |
| 8,643,201 B2* | 2/2014 | Scott | H02K 7/1846 290/1 R |
| 8,712,620 B2* | 4/2014 | Jackson | B60L 11/1803 701/22 |
| 8,827,022 B2* | 9/2014 | Jaberian | B60K 25/08 180/65.1 |
| 8,935,933 B1* | 1/2015 | Koelsch | B60H 1/00014 62/115 |
| 2007/0095587 A1* | 5/2007 | DuCharme | B60K 6/12 180/65.31 |
| 2007/0261902 A1* | 11/2007 | Margoudakis | H02P 7/10 290/1 C |
| 2009/0288899 A1* | 11/2009 | Belloso | B60K 5/08 180/69.6 |
| 2010/0241298 A1* | 9/2010 | Sinke | B60K 6/48 701/22 |
| 2011/0031051 A1* | 2/2011 | George | B60L 11/12 180/65.31 |
| 2013/0081886 A1* | 4/2013 | Jaberian | B60K 25/08 180/65.31 |
| 2013/0098699 A1* | 4/2013 | Francis | B60L 11/123 180/65.31 |
| 2013/0332014 A1* | 12/2013 | Jackson | B60L 11/1803 701/22 |

* cited by examiner

BACKUP POWER GENERATOR FOR BATTERY POWERED TRANSPORT REFRIGERATION UNITS

This application is a utility patent application claiming priority from U.S. Provisional patent application Ser. No. 62/076,020, filed Nov. 6, 2014.

BACKGROUND

The present disclosure relates to the generation of electrical power for large-vehicle transport refrigeration units (TRU) such as semi-trailer reefers. A generator is mounted to the vehicle frame or axle carriage and driven by a wheel-pulley system. Translational motion of the heavy vehicle produces electrical power. A solar panel is installed on the roof of the battery powered TRU to charge the battery when the unit is stationary or in motion.

Recent developments in battery powered transport refrigeration units such as semi-trailer reefers, demonstrate a need for an efficient and economical power generation method capable of running the electrical refrigeration unit and charging the battery. The refrigerated food product carried by these reefers is at risk when unscheduled delivery delays are encountered. The reefer can stop cooling because of limited battery capacity. This invention provides backup power to keep the reefer running. If battery power runs out the reefer trailer can be pulled down the road to generate enough power to run the reefer and recharge the battery thus preventing the loss of the perishable-refrigerated food. This also allows for battery pack size to be reduced or minimized. The high cost of battery packs can be a deterrent for high-volume deployment of the technology. This disclosure provides a method for assisting high-volume deployment.

Prior art systems mount a generator directly on the trailer axle or make use of an axle-differential combination to drive a frame-mounted generator with a drive shaft.

The axle-mounted generator is undesirable because the generator takes excessive punishment from road vibration and mechanical shock. Every time the wheel mounted to the axle hits a bump in the road the movement is transmitted to the generator resulting in poor generator reliability.

The axle, differential and driveshaft combination solves this problem because the generator can be mounted solidly to the trailer frame. However, this system is heavy, expensive and requires changing the trailer axle to a truck type axle with a differential.

THE DISCLOSURE

Figure 1:
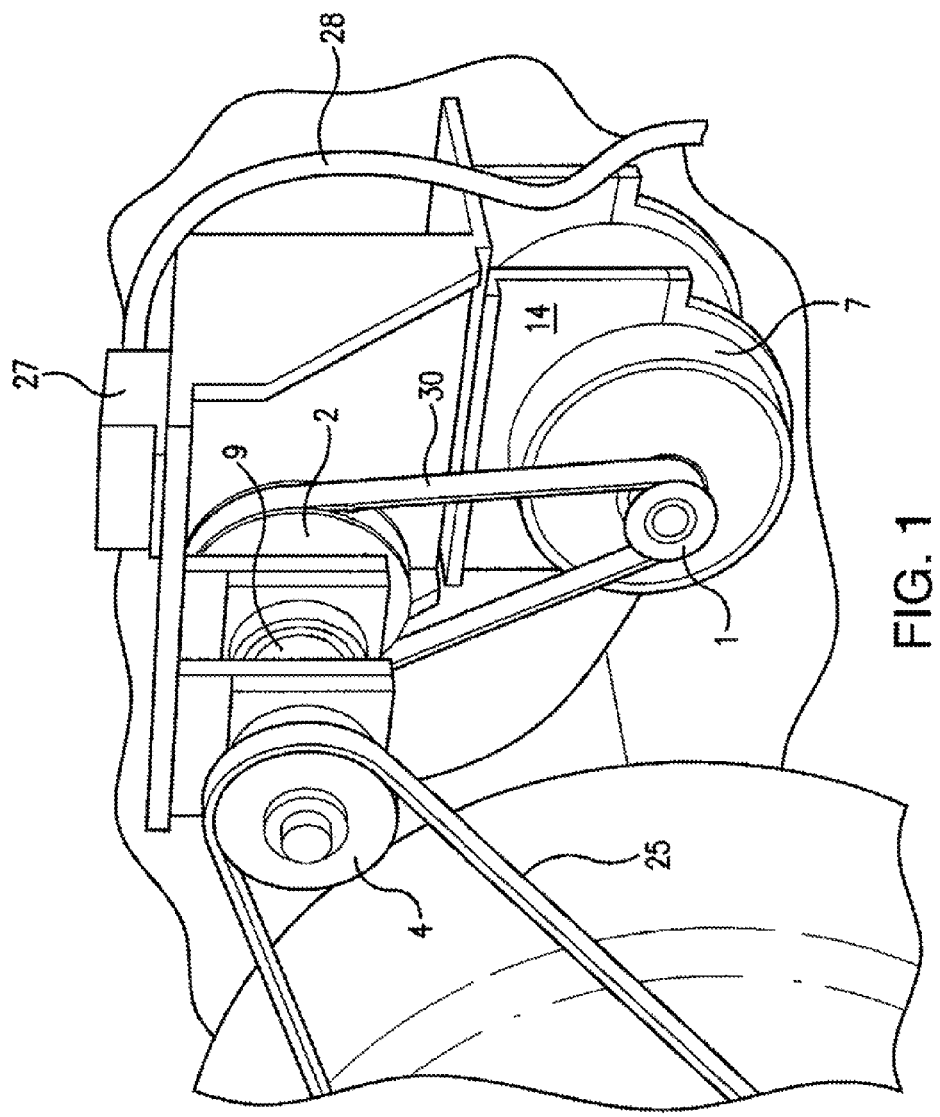
FIG. 1 is a view in perspective of an assembly of the device showing it mounted under a semi-truck trailer.
Figure 2:
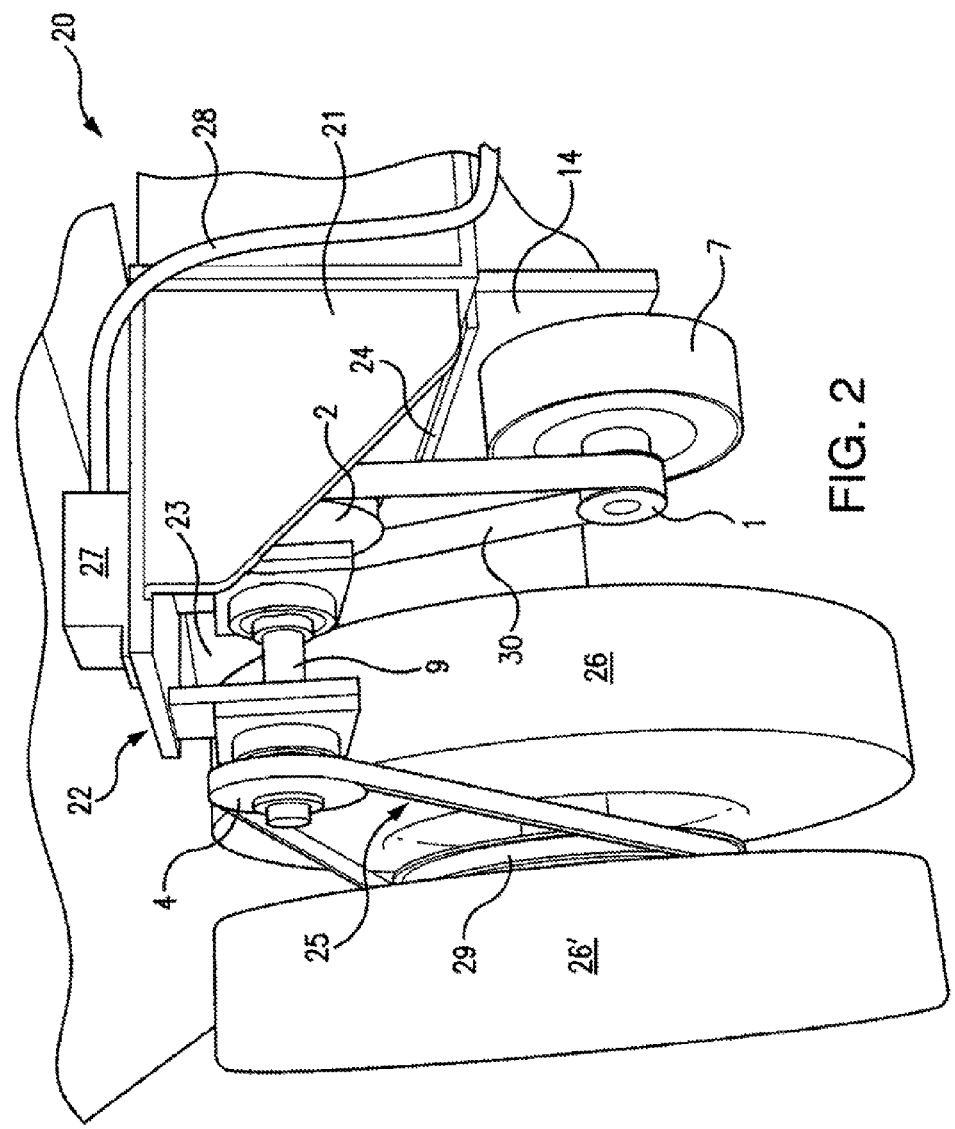
FIG. 2 is a view from the front showing the connectability of the assembly to the pulley mounted between the wheels of a semi-truck trailer.

Thus, what is disclosed and claimed herein is a battery powered transport refrigeration unit 20 comprising in combination a first support housing 21, wherein the first support housing has at least a top 22, an open front 23, and an open bottom 24.

Figure 3:
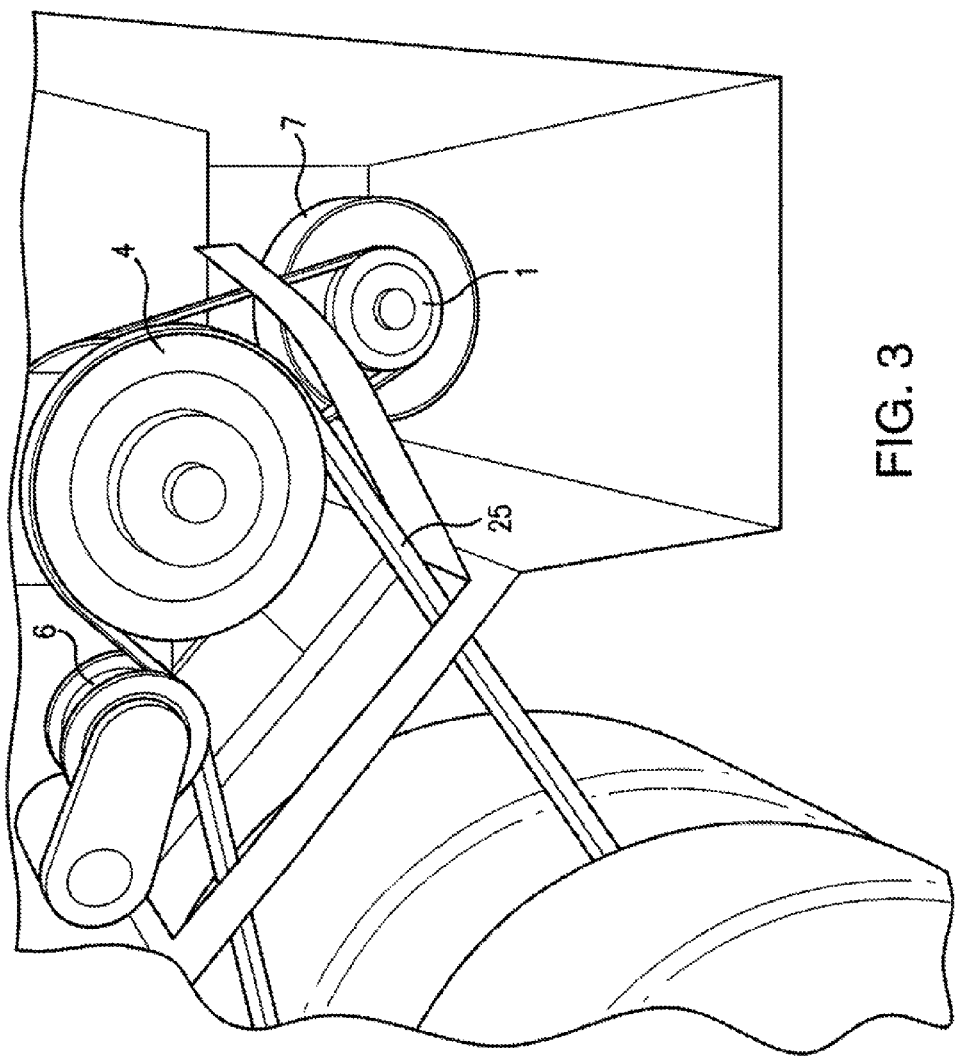
FIG. 3 is view of the first pulley on a jackshaft with the idler in place.
Figure 4:
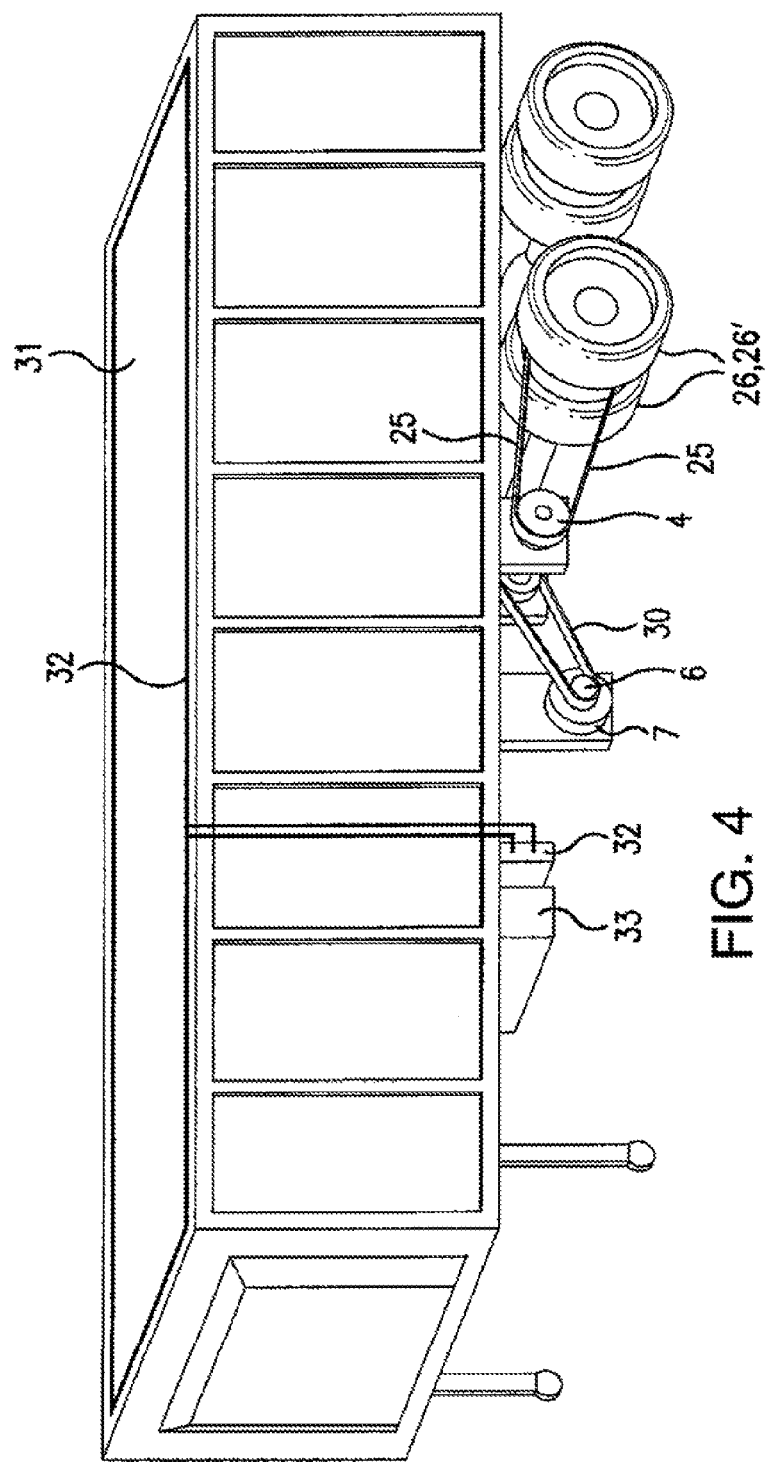
FIG. 4 is a view in perspective of a reefer in which there is shown a solar panel mounted on the top of the reefer.
Figure 5:
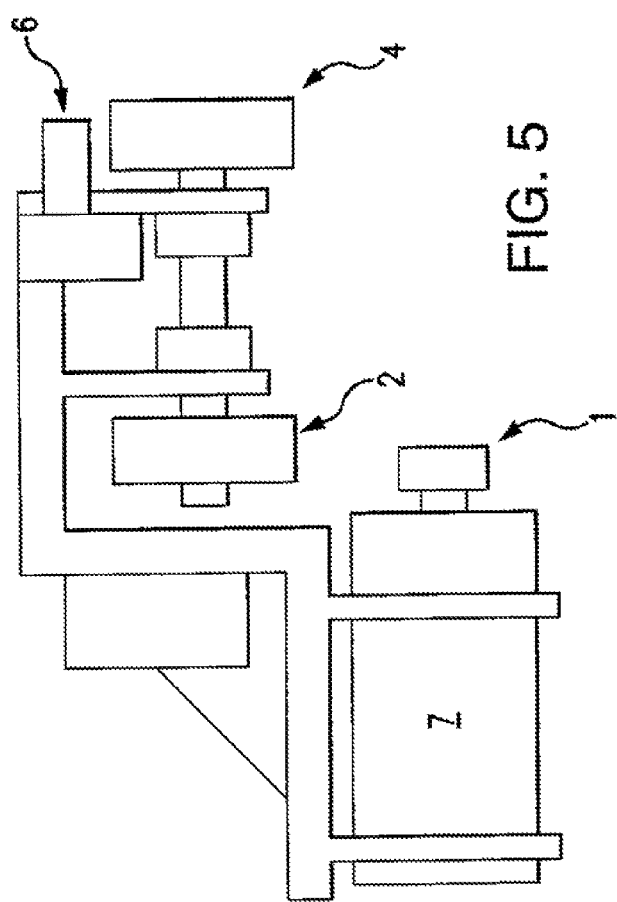
FIG. 5 is an illustration of a device of this invention.

The first support housing 21 contains and supports therein, a jackshaft 9, the jackshaft 9 having a first pulley 4 on one end and a second pulley 2 on an opposite end. The first pulley 4 is connected by a V-belt 25 to a drive pulley 29, the drive pulley 29 being located between two wheels 26 and 26' of a semi-truck trailer and any tension on the V-belt 25 is regulated by a spring loaded idler wheel 6 (FIG. 3) impinging on the V-belt 25.

There is a second support housing 14 supporting a generator 7 in it. The generator 7 has a wide pulley 1 on one end wherein the wide pulley 1 and the second pulley 2 of the jackshaft are connected by a cog belt 30.

Surmounted on the first support housing 21 is a voltage regulator 27, wherein the voltage regulator 27 is electrically connected to the generator 7, and the voltage regulator 27 is also electrically connected to at least one battery by leads 28.

This disclosure eliminates both the road shock problem of an axle-mounted generator and a cost-weight problem of the axle-differential frame mounted configuration. The generator 7 is mounted to the vehicle frame or in the case of a semi-trailer with adjustable axles, to the axle carriage. The pulley 1 on the generator is driven by a jackshaft pulley 2, which is driven by a pulley 29 mounted to the wheel assembly of the vehicle. This wheel pulley 29 is placed on the wheel studs between the dual wheels 26 26' of a dual wheel configuration. In the case of a single wheel the pulley is welded or similarly attached to the rim or brake drum.

The generator/alternator pulley 1 is driven with the inboard jackshaft pulley 2 using a chain or nonslip type belt such as a cog belt 30. The length of the jackshaft axle 9 is chosen to accommodate the desired inset distance of the generator 7 from the side of the trailer. Stress from up and down wheel movement is isolated from the generator 7 by the jackshaft assembly. A slip type belt 25 is used between the outboard jackshaft pulley 4 and the wheel pulley 29 to allow for some slippage during sudden acceleration and deceleration. This prevents over stressing shafts and attachments.

The generator 7 output can be controlled to eliminate any increase in fuel consumption of the driving vehicle such as a semi-tractor. The electrical output is adjusted by an accelerometer to be zero during any acceleration or cruise phase of vehicle movement thus avoiding any additional drag on the tractor. The generator 7 becomes completely regenerative meaning there is no drag on the tractor because the generator 7 only makes power during deceleration.

Likewise, the solar panel 31 installed flush on the trailer roof represents no additional drag. The electric power from the solar panel 31 is sent to a voltage control unit via leads 32 that makes the proper voltage for the battery 33. This control unit also adjusts current to assure proper charging of the battery. The stored electric energy is then used to run the refrigeration system of the TRU.

The solar panel battery charging and the regenerative generator feature of this invention make the battery powered TRU a vehicle for zero emission transport refrigeration.

What is claimed is:

1. A backup power generator for battery powered transport refrigeration units comprising in combination:
   i. a first support housing, said first support housing having at least a top, an open front, and an open bottom;
   ii. said support housing containing and supporting therein, a jackshaft, said jackshaft having a first pulley on one end and a second pulley on an opposite end;

iii. said first pulley being connected by a V-belt to a drive pulley, said drive pulley being located between two wheels of a semi-truck trailer, any tension on said V-belt being regulated by a spring loaded idler wheel impinging on said V-belt;
iv. a second support housing supporting a generator therein, said generator having a wide pulley on one end thereof, said wide pulley and said second pulley of said jackshaft being connected by a cog belt;
v. surmounted on said first support housing, a voltage regulator, wherein said voltage regulator is electrically connected to said generator;
vi. said voltage regulator being electrically connected to at least one battery.

2. The backup power generator for battery powered transport refrigeration unit as claimed in claim 1 wherein the unit is electrically supplemented by the use of at least one solar panel mounted on the top of a reefer that also has the battery powered transport refrigeration unit mounted on said reefer.

\* \* \* \* \*